(12) United States Patent
Kii et al.

(10) Patent No.: US 11,380,332 B2
(45) Date of Patent: Jul. 5, 2022

(54) INFORMATION PROCESSING APPARATUS, INFORMATION PROCESSING METHOD, AND COMPUTER PROGRAM

(71) Applicant: Sony Mobile Communications Inc., Tokyo (JP)

(72) Inventors: Manabu Kii, Shinagawa-ku (JP); Hidehiro Komatsu, Shinagawa-ku (JP); Atsushi Ishihara, Shinagawa-ku (JP); Yu Shigeta, Shinagawa-ku (JP); Junji Itoyama, Shinagawa-ku (JP)

(73) Assignee: Sony Mobile Communications Inc., Tokyo (JP)

( * ) Notice: Subject to any disclaimer, the term of this patent is extended or adjusted under 35 U.S.C. 154(b) by 178 days.

(21) Appl. No.: 16/470,248

(22) PCT Filed: Jan. 31, 2018

(86) PCT No.: PCT/JP2018/003303
§ 371 (c)(1),
(2) Date: Jun. 17, 2019

(87) PCT Pub. No.: WO2018/155116
PCT Pub. Date: Aug. 30, 2018

(65) Prior Publication Data
US 2020/0118570 A1    Apr. 16, 2020

(30) Foreign Application Priority Data
Feb. 24, 2017  (JP) .............................. JP2017-033595

(51) Int. Cl.
*G10L 17/00*    (2013.01)
*B25J 11/00*    (2006.01)
(Continued)

(52) U.S. Cl.
CPC ............ *G10L 17/00* (2013.01); *B25J 11/0005* (2013.01); *G05B 19/414* (2013.01); *G06F 3/14* (2013.01);
(Continued)

(58) Field of Classification Search
CPC ......... G10L 15/00–15/34; G10L 17/00–17/26; B25J 11/0005; G05B 19/424;
(Continued)

(56) References Cited

U.S. PATENT DOCUMENTS 7,630,986 B1 * 12/2009 Herz ...................... G06Q 10/10
10,028,112 B2 * 7/2018 Child ..................... H04W 4/16
(Continued)

FOREIGN PATENT DOCUMENTS

JP    1-194734 A    8/1989
JP    9-312689 A    12/1997
(Continued)

OTHER PUBLICATIONS

Partial supplementary European search report dated Jan. 31, 2020, issued in corresponding European Patent Application No. 18757656.6.
(Continued)

*Primary Examiner* — Abul K Azad
(74) *Attorney, Agent, or Firm* — Xsensus LLP

(57) ABSTRACT

Provided is an information processing apparatus capable of reliably delivering a message to a third party desired by a user.
Provided is an information processing apparatus including an acquisition unit configured to acquire information including a sound message, and a recognition unit configured to recognize a sender of the sound message, a destination of a message included is the sound message, and content of the message from the information acquired by the acquisition
(Continued)

unit, in which the recognition unit generates information for inputting the destination of the message is a case where the destination cannot be uniquely specified.

10 Claims, 13 Drawing Sheets

(51) Int. Cl.
    *G05B 19/414*    (2006.01)
    *G06F 3/14*    (2006.01)
    *G06N 3/00*    (2006.01)
    *G06V 40/16*    (2022.01)
    *G08B 5/38*    (2006.01)

(52) U.S. Cl.
CPC ........... *G06N 3/008* (2013.01); *G06V 40/161* (2022.01); *G05B 2219/50391* (2013.01); *G08B 5/38* (2013.01)

(58) Field of Classification Search
CPC ............ G05B 2219/50391; G06F 3/14; G06K 9/00228; G06N 3/008; G08B 5/38
See application file for complete search history.

(56) References Cited

U.S. PATENT DOCUMENTS

| | | | |
|---|---|---|---|
| 2002/0081937 A1* | 6/2002 | Yamada | A63H 3/48 |
| | | | 446/175 |
| 2007/0129061 A1 | 6/2007 | Ringland et al. | |
| 2007/0135962 A1* | 6/2007 | Kawabe | G10L 13/00 |
| | | | 700/225 |
| 2013/0303192 A1* | 11/2013 | Louboutin | H04W 4/02 |
| | | | 455/456.3 |
| 2015/0220507 A1 | 8/2015 | Mohajer et al. | |

FOREIGN PATENT DOCUMENTS

| | | |
|---|---|---|
| JP | 2003-5778 A | 1/2003 |
| JP | 2003-208190 A | 7/2003 |
| JP | 2004-90109 A | 3/2004 |
| WO | 03/092248 A2 | 11/2003 |

OTHER PUBLICATIONS

International Search Report and Written Opinion dated Apr. 24, 2018 for PCT/JP2018/003303 filed on Jan. 31, 2018, 8 pages including English Translation of the International Search Report.

* cited by examiner

FIG. 9
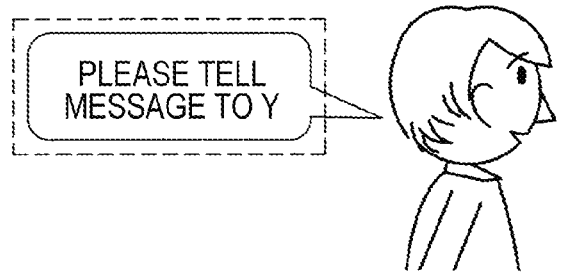
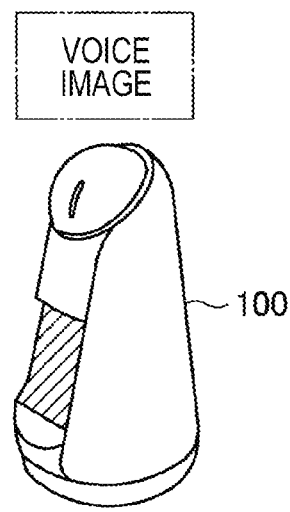
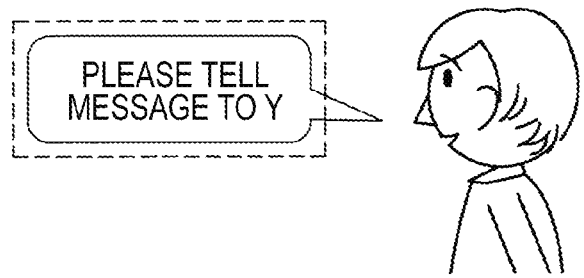
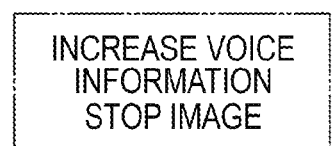
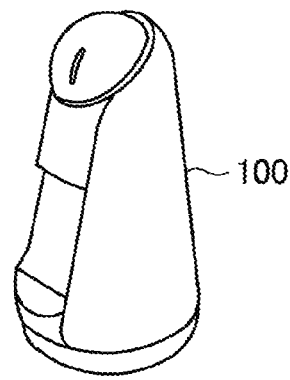

FIG. 10
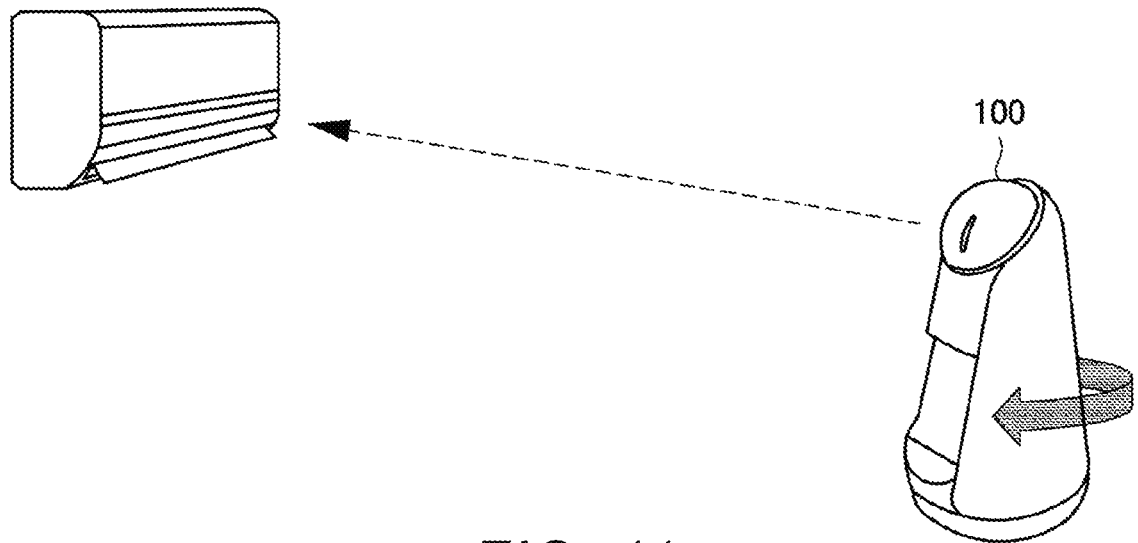
FIG. 11
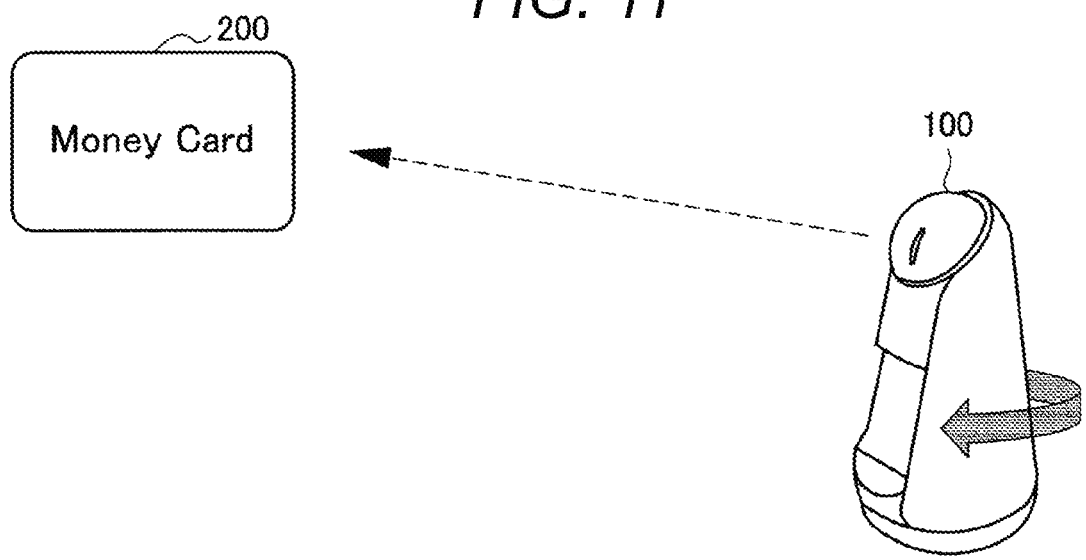
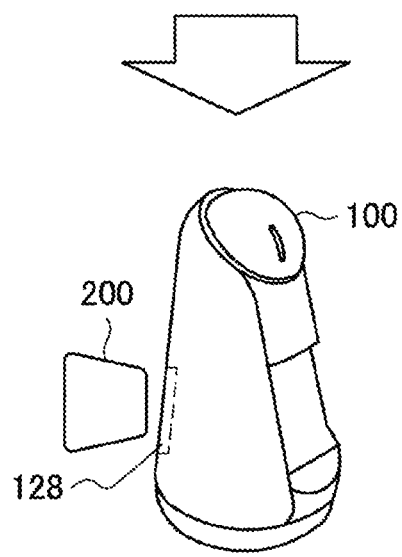

FIG. 15
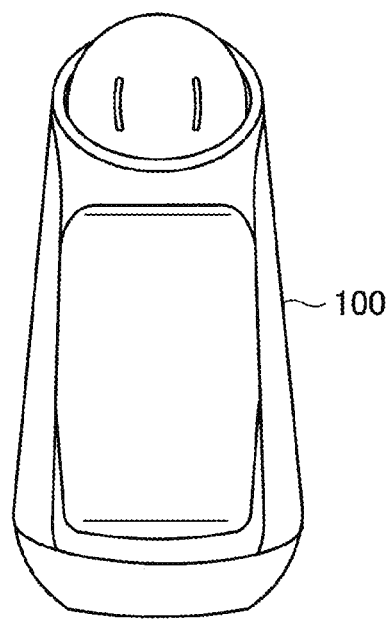
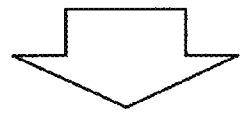
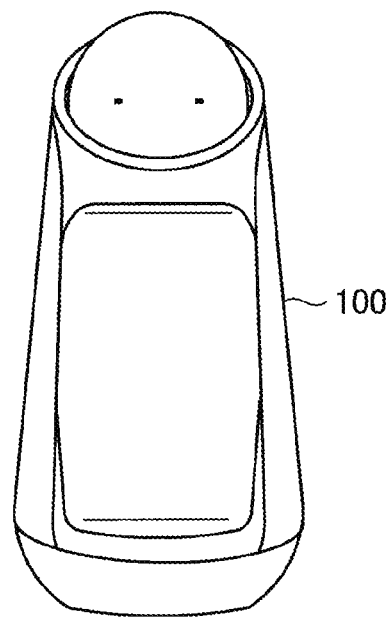

INFORMATION PROCESSING APPARATUS, INFORMATION PROCESSING METHOD, AND COMPUTER PROGRAM

CROSS-REFERENCE TO RELATED APPLICATIONS

The present application is based on PCT filing PCT/JP2018/003303, filed Jan. 31, 2018 which claims priority to JP 2017-033595, filed Feb. 24, 2017, the entire contents of each are incorporated herein by reference.

TECHNICAL FIELD

The present disclosure relates to an information processing apparatus, an information processing method, and a computer program.

BACKGROUND ART

For example, Patent Document 1 discloses a technology for a robot apparatus that obtains a message from a user, interacts with a third party desired by the user, and notifies the message.

CITATION LIST

Patent Document

Patent Document 1: Japanese Patent Application Laid-Open No. 2004-90109

SUMMARY OF THE INVENTION

Problems to be Solved by the Invention

However, to deliver the message to the third party desired by the user, the robot needs to recognize who the third party is, and if the robot cannot recognize a partner to which the user wants to give the message, the robot will not know who the message is delivered to.

Therefore, the present disclosure proposes new and improved information processing apparatus, information processing method, and computer program capable of reliably delivering a message to a third party desired by a user.

Solutions to Problems

According to the present disclosure, provided is an information processing apparatus including an acquisition unit configured to acquire information including a sound message, and a control unit configured to recognize a sender of the sound message, a destination of a message included in the sound message, and content of the message from the information acquired by the acquisition unit, in which the control unit generates information for inputting the destination of the message in a case where the control unit is not able to uniquely specify the destination.

Furthermore, according to the present disclosure, provided is an information processing method for causing a processor to execute acquiring information including a sound message, recognizing a sender of the sound message, a destination of a message included in the sound message, and content of the message from the acquired information, and generating information for inputting the destination of the message in a case where the destination is not able to be uniquely specified.

Furthermore, according to the present disclosure, provided is a computer program for causing a computer to execute acquiring information including a sound message, recognizing a sender of the sound message, a destination of a message included in the sound message, and content of the message from the acquired information, and generating information for inputting the destination of the message in a case where the destination is not able to be uniquely specified.

Effects of the Invention

As described above, according to the present disclosure, new and improved information processing apparatus, information processing method, and computer program capable of reliably delivering a message to a third party desired by a user can be provided.

Note that the above-described effect is not necessarily limited, and any of effects described in the present specification or another effect that can be grasped from the present specification may be exerted in addition to or in place of the above-described effect.

BRIEF DESCRIPTION OF THE DRAWINGS

FIG. 9 is an explanatory view illustrating an example in which the agent apparatus 100 changes an operation depending on a case where the user who is speaking is facing the agent apparatus 100 and a case where the user who is speaking is not facing the agent apparatus 100.

FIG. 10 is an explanatory view illustrating a state of causing the agent apparatus 100 to recognize an air conditioner and causing the agent apparatus 100 to remotely operate the air conditioner.

FIG. 11 is an explanatory view illustrating a state in which the agent apparatus 100 directs a reader/writer toward the user when an IC card is presented to the agent apparatus 100.

FIG. 15 is an explanatory view illustrating an example of expression presented by the agent apparatus 100.

MODE FOR CARRYING OUT THE INVENTION

Figure 1:
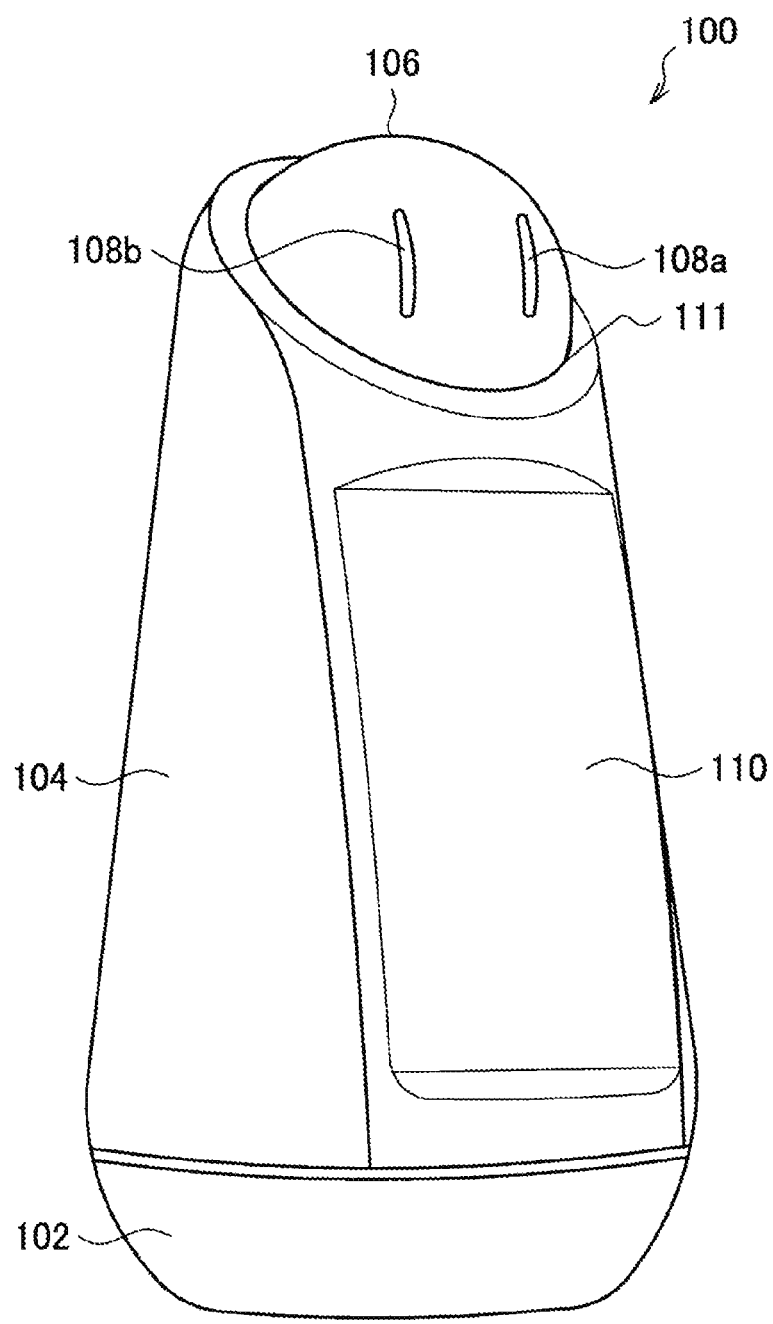
FIG. 1 is an explanatory view illustrating an appearance example of an agent apparatus 100 according to an embodiment of the present disclosure.

Favorable embodiments of the present disclosure will be described in detail below with reference to the accompanying drawings. Note that, in the present specification and the drawings, redundant description of constituent elements having substantially the same functional configurations is omitted by giving the same reference numerals.

Note that the description will be given in the following order.

1. Embodiment of the present disclosure
1.1. Appearance example
1.2. Functional configuration example
1.3. Operation example
2. Conclusion

1. Embodiment of the Present Disclosure

1.1. Appearance Example

First, as appearance example of an information processing apparatus (hereinafter, referred to as an agent apparatus) having a conversation function according to an embodiment of the present disclosure will be described with reference to the drawings. This agent apparatus is assumed to be installed in a room, for example, on a table.

FIG. 1 is an explanatory view illustrating an appearance example of an agent apparatus 100 according to an embodiment of the present disclosure. Hereinafter, the appearance example of the agent apparatus 100 according to the embodiment of the present disclosure will be described with reference to FIG. 1.

The agent apparatus 100 according to the embodiment of the present disclosure includes a base unit 102, a torso unit 104, and a head unit 106. The base unit 102 stabilizes the agent apparatus 100 when the agent apparatus 100 is installed on a table or the like.

The torso unit 104 includes a display 110. The display 110 is configured by, for example, a liquid crystal display or an organic EL display. The display 110 may also include a touch panel. The torso unit 104 can be rotated in a horizontal direction by a predetermined angle, for example, approximately 360 degrees, and at that time, the agent apparatus 100 can rotate only the torso unit 104 without moving the base unit 102.

The head unit 106 is provided on an upper portion of the torso unit 104. The head unit 106 includes light emitting units 108a and 108b. Light emission regions and light emission colors of the light emitting units 108a and 108b may change according to a state of the agent apparatus 100. For example, the light emission regions of the light emitting units 108a and 108b change in a short time, which enable an operation as if the agent apparatus 100 is blinking. Furthermore, the head unit 106 can be rotated up and down and right and left by a predetermined angle, and at that time, the agent apparatus 100 can rotate only the head unit 106 without moving the base unit 102 and the torso unit 104.

The torso unit 104 has an indicator 111 by a light emitting diode (LED) at a boundary with the head unit 106. The indicator 111 may change a light emission pattern or the light emission color according to the state of the agent apparatus 100.

For example, while the user is talking to the agent apparatus 100, the agent apparatus 100 may keep the indicator 111 lit while recognizing speech, and the agent apparatus 100 may cause the indicator 111 to blink in accordance with a sound output while outputting a sound from the agent apparatus 100.

Although not illustrated in FIG. 1, the agent apparatus 100 according to the embodiment of the present disclosure includes, as described below, a camera for capturing an ambient environment, a microphone for collecting a human voice, an ambient environmental sound, and the like, a speaker for outputting a sound, and a sensor for sensing states of the agent apparatus 100 and the ambient environment. The agent apparatus 100 includes a plurality of beamformed microphones so as to easily collect the human voice, ambient environmental sound, and the like.

Furthermore, although not illustrated in FIG. 1, the agent apparatus 100 according to the embodiment of the present disclosure includes a reader/writer that performs proximity non-contact communication on an opposite side of the display 110. When an IC card is brought to approach the reader/writer, the agent apparatus 100 can execute processing according to the proximity.

The agent apparatus 100 according to the embodiment of the present disclosure is configured to be able to analyze speech content of the user and execute processing according to the speech content. For example, the agent apparatus 100 analyzes the speech content of the user and outputs a sound according to the speech content, thereby performing interactive processing of the user. Specifically, when the user talks to the agent apparatus 100 that "tell me the weather forecast of Tokyo for tomorrow", the agent apparatus 100 analyzes the speech content and acquires the weather forecast of Tokyo for the next day from the Internet. Then, the agent apparatus 100 outputs, for example, "Tomorrow's Tokyo will be occasionally cloudy" or the like, as a sound, a text, an image, or the like.

Furthermore, in a case where a certain user (user X) wants to leave a message including a sound message to another user (user Y), the agent apparatus 100 according to the embodiment of the present disclosure analyzes words uttered by the user X and stores information regarding content of the message and a destination (user Y) of the message. Then, when detecting the presence of the user Y, the agent apparatus 100 outputs, to the user Y, the message left by the user X.

As described above, the appearance example of the agent apparatus 100 according to the embodiment of the present disclosure has been missed with reference to FIG. 1. Next, a functional configuration example of the agent apparatus 100 according to the embodiment of the present disclosure has been described.

1.2. Functional Configuration Example

Figure 2:
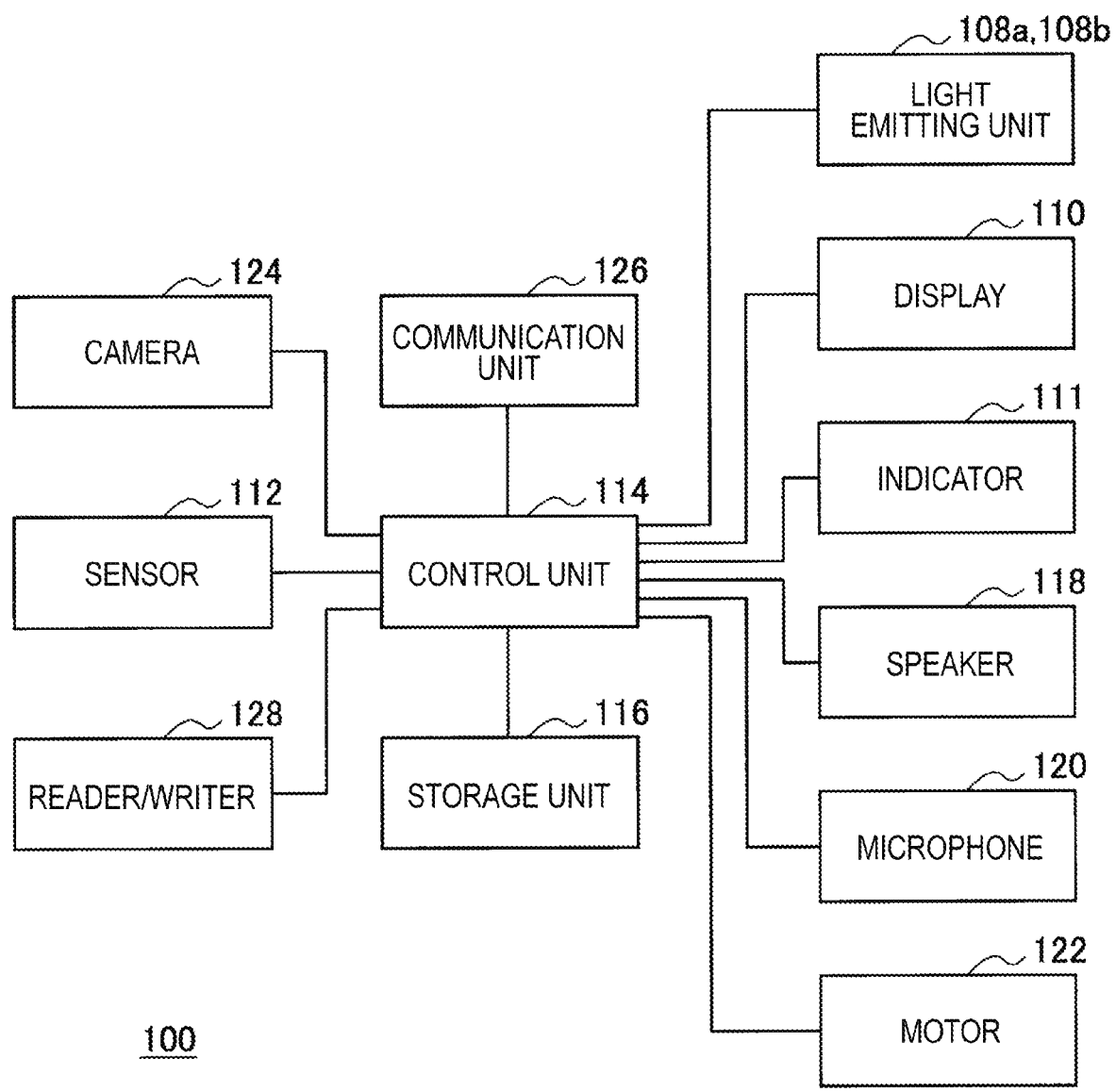
FIG. 2 is an explanatory diagram illustrating a functional configuration example of the agent apparatus 100 according to the embodiment.

FIG. 2 is an explanatory diagram illustrating a functional configuration example of the agent apparatus 100 according to the embodiment of the present disclosure. Hereinafter, a functional configuration example of the agent apparatus 100 according to the embodiment of the present disclosure will be described with reference to FIG. 2.

As illustrated in FIG. 2, the agent apparatus 100 according to the embodiment of the present disclosure includes the light emitting units 108a and 108b, the display 110, the indicator 111, a sensor 112, a control unit 114, a storage unit 116, a speaker 118, a microphone 120, a motor 122, a camera 124, a communication unit 126, and a reader/writer 128. Here, the sensor 112, the control unit 114, the storage unit 116, the speaker 118, the microphone 120, the motor 122, the camera 124, the communication unit 126, and the reader/writer 128, which are not illustrated in FIG. 1, will be described.

The sensor 112 senses the states of the agent apparatus 100 and the ambient environment, and outputs sensing data obtained by the sensing to the control unit 114. The sensor 112 as configured by at least one of various sensors such as, for example, a human sensor, a positioning sensor, a gyro sensor, a geomagnetic sensor, an illuminance sensor, a temperature sensor, a humidity sensor, an atmospheric pressure sensor, and a heart rate sensor. Note that the above-described positioning sensor may include, specifically, a global navigation satellite system (GNSS) receiver, and/or a communication device, for example. The GNSS may include, for example, a global positioning system (GPS), a global navigation satellite system (GLONASS), a Beidou navigation satellite system (BDS), a quasi-zenith satellites system (QZSS), Galileo, or the like. Furthermore, the positioning sensor may include, for example, a sensor for detecting a position using a technology such as wireless LAN, multi-input multi-output (MIMO), cellular communication (for example, position detection using a mobile base station or a femtocell), or near field communication (for example, Bluetooth low energy (BLE) or Bluetooth (registered trademark)).

The control unit 114 is configured by, for example, a central processing unit (CPU), a read only memory (ROM), and a random access memory (RAM), and controls the operation of the agent apparatus 100. The control unit 114 may use the sensing data output by the sensor 112, sound data collected by the microphone 120, image data captured by the camera 124, communication data received by the communication unit 126, data stored in the storage unit 116, and the like when controlling the operation of the agent apparatus 100.

In the present embodiment, the control unit 114 executes an operation as described in detail below. By the control unit 114 performing the operation as described below, the agent apparatus 100 can execute interactive processing with a human, message processing to a human, and the like.

The storage unit 116 is configured by, for example, a non-volatile or volatile memory, and stores programs and data necessary for the operation of the agent apparatus 100 and stores a log of the operation of the agent apparatus 100.

The speaker 118 outputs a sound under the control of the control unit 114. The microphone 120 collects the voice of a human around the agent apparatus 100, the ambient environmental sound, and the like. The sound collected by the microphone 120 is sent to the control unit 114. The motor 122 is a motor for driving the torso unit 104 and the head unit 106 under the control of the control unit 114. The camera 124 captures the environment around the agent apparatus 100 as a still image or a moving image. The camera 124 is provided, on, for example, the head unit 106, and captures a direction of the front (a surface on which the light emitting units 108*a* and 108*b* are provided) of the agent apparatus 100. The communication unit 126 executes communication processing with another device by, for example, being connected to a wireless LAN, or the like or using a wireless communication standard such as infrared communication or Bluetooth (registered trademark). The reader/writer 128 executes communication with an IC card or the like by proximity non-contact communication.

The agent apparatus 100 according to the embodiment of the present disclosure can execute an operation as described below by having such a configuration.

As described above, the functional configuration example of the agent apparatus 100 according to the embodiment of the present disclosure has been described with reference to FIG. 2. Next, an operation example of the agent apparatus 100 according to the embodiment of the present disclosure will be described.

1.3. Operation Example

The agent apparatus 100 according to the embodiment of the present disclosure analyzes content spoken by a certain user, and outputs an output of information as a sound or an image on the basis of an analysis result. For example, when a certain user speaks to the agent apparatus 100 that "tell me the tomorrow weather", the agent apparatus 100 analyzes speech content of the user by the control unit 114 and determines that the speaker wants to know weather forecast. Therefore, the agent apparatus 100 is connected to the Internet from the communication unit 126, acquires weather forecast data of the next day, and outputs the weather forecast as a sound or an image.

Furthermore, in a case where a certain user (user X) wants to leave a message including a sound message to another user (user Y), the agent apparatus 100 according to the embodiment of the present disclosure analyzes words uttered by the user X, and outputs the message left by the user X to the user Y when detecting the presence of the user Y.

Figure 3:
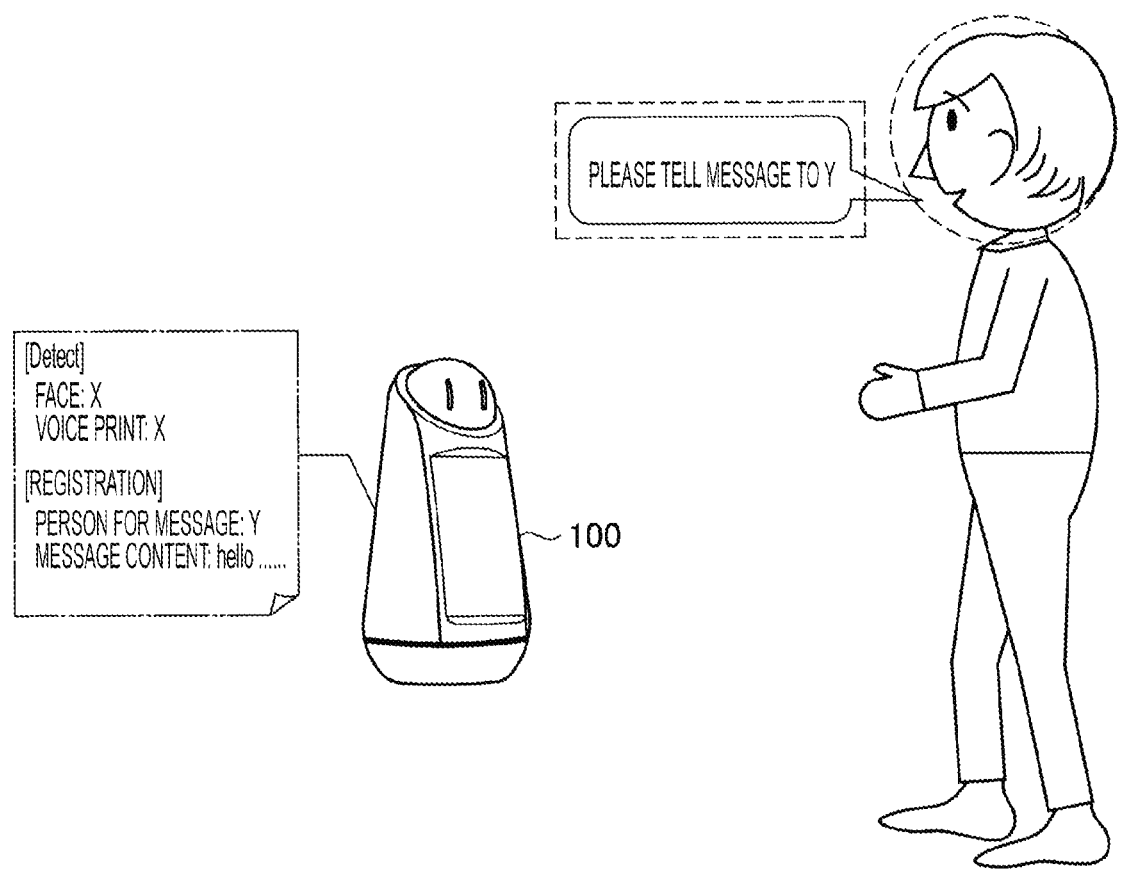
FIG. 3 is an explanatory view for describing an operation of the agent apparatus 100 according to the embodiment.

FIG. 3 is an explanatory view for describing an operation of the agent apparatus 100 according to the embodiment of the present disclosure, and illustrates a state in which a user X talks to the agent apparatus 100 about a message for a user Y. In FIG. 3, the user X speaks to the agent apparatus 100 that "please tell a message to Y", and then speaks to the agent apparatus 100 about the message that the user X want to leave to the user Y. The agent apparatus 100 performs face recognition processing using captured data by the camera 124 and voice print recognition processing using the sound data collected by the microphone 120 by the control unit 114 to recognize that who has uttered the message is the user X. Note that it is assumed that the agent apparatus 100 grasps what the user X looks like and what the voice sounds like in advance by the face recognition processing and the voice print recognition processing. For example, the agent apparatus 100 may store in advance the face, the voice, and the like of the user X in the storage unit 116 on the basis of the image data acquired by the camera 124 and the sound data acquired by the microphone 120. Furthermore, the agent apparatus 100 may store information of a name, an age, and the like input (or selected) by the user using the touch panel provided on the display 110, in the storage unit 116.

At this time, the control unit 114 first performs the face recognition processing using the captured data by the camera 124 to attempt specification of the user, and in a case where the user cannot be specified by the face recognition processing, the control unit 114 may perform the voice print recognition processing using the sound data collected by the microphone 120 to specify the user.

Then, the agent apparatus 100 collects the words uttered by the user X with the microphone 120, and the control unit 114 analyzes the sound data collected by the microphone 120 using predetermined language analysis processing. The agent apparatus 100 determines that the target of the message of the user X is the user Y as a result of analysis in the control unit 114, and stores the content of the message for the user Y uttered by the user X and information (for example, a name, an ID, and the like) regarding the destination (user Y) of the message in the storage unit 116. The agent apparatus 100 may store information regarding a sender (user X) of the message in the storage unit 116. Furthermore, the agent apparatus 100 may store the recorded message from the user X as it is or may store the message together with image data captured by the camera 124 in a case of recording the recorded message. Furthermore, the agent apparatus 100 may convert the message from the user X into text data and store the text data.

Figure 4:
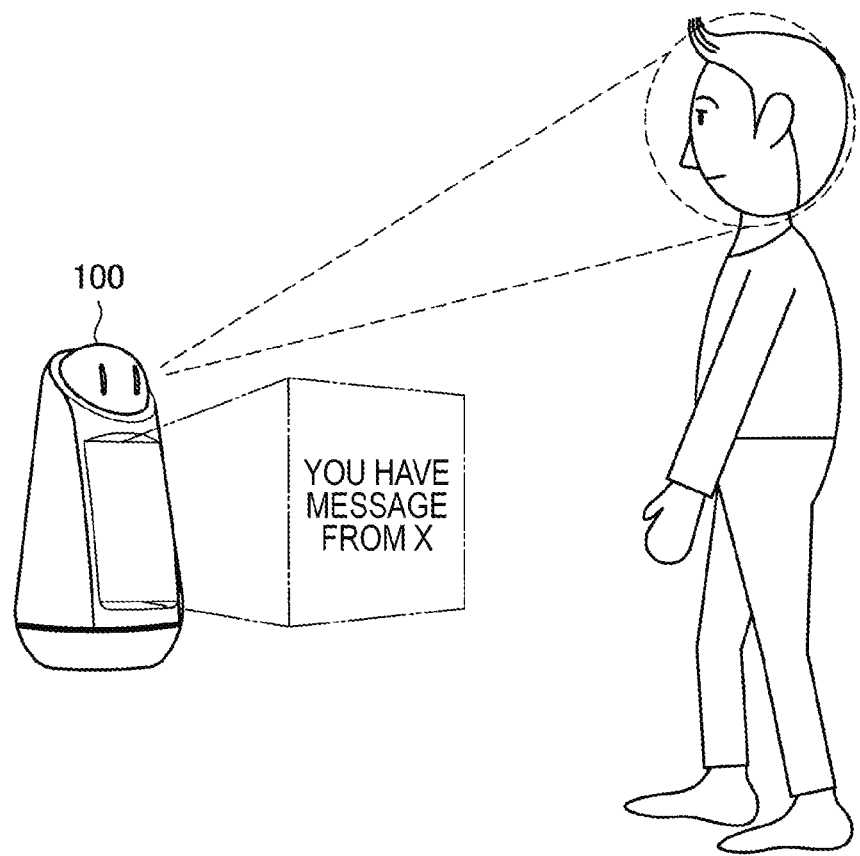
FIG. 4 is an explanatory view for describing an operation of the agent apparatus 100 according to the embodiment.

FIG. 4 is an explanatory view for describing an operation of the agent apparatus 100 according to the embodiment of the present disclosure, and illustrates a state in which the user Y is approaching the agent apparatus 100. After the user X has left a message on the agent apparatus 100, when the user Y enters a room where the agent apparatus 100 is located and faces the agent apparatus 100, the agent apparatus 100 performs, by the control unit 114, the face recognition processing using the captured data by the camera 124 and the voice print recognition processing using the sound data collected by the microphone 120 to recognize who is in front of the apparatus.

As a result of performing the face recognition processing and the voice print recognition processing, when the agent apparatus 100 recognizes it is the user Y who is in front of the apparatus, the agent apparatus 100 notifies the user Y of the message left by the user X to the user Y. At this time, as a method of notifying the message, the agent apparatus 100 may record the words uttered by the user X and output the recorded data from the speaker 118. Furthermore, as the method of notifying the message, the agent apparatus 100 may output the content of the message from the speaker 118 by sound synthesis processing. Furthermore, as the method of notifying the message, the agent apparatus 100 may convert the words uttered by the user X into texts and display the texts on the display 110.

Figure 5:
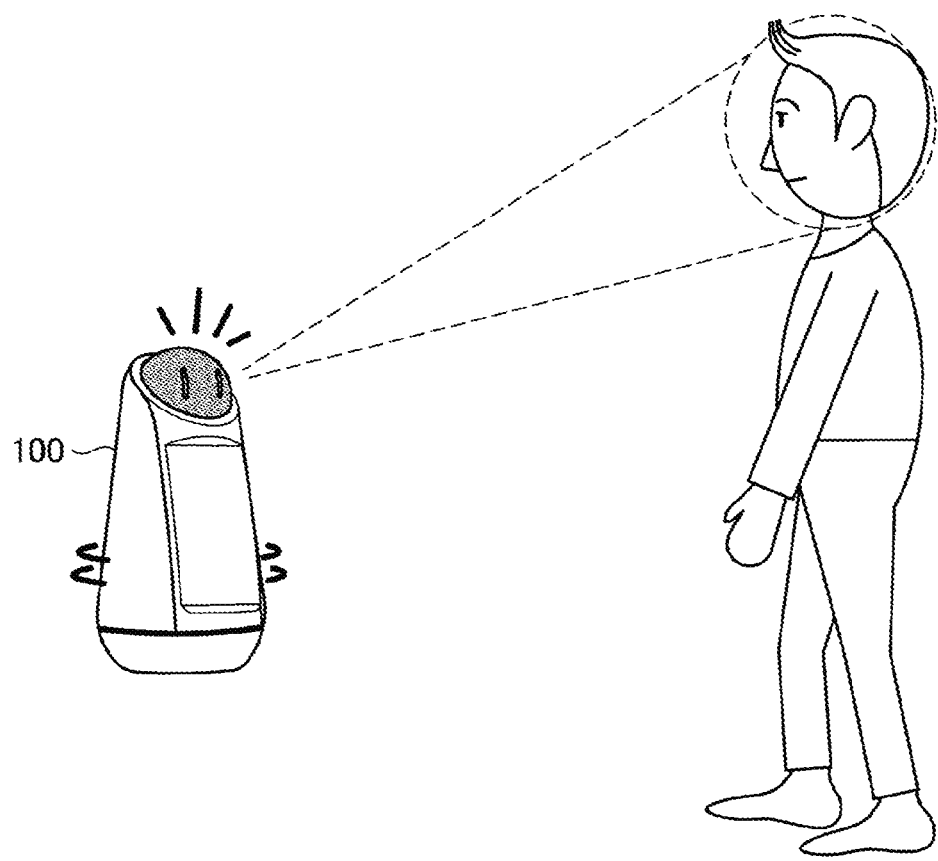
FIG. 5 is an explanatory view illustrating an operation example of the agent apparatus 100 according to the embodiment.

Note that, when the agent apparatus 100 recognizes it is the user Y who is in front of the apparatus as a result of performing the face recognition processing and the voice print recognition processing, the agent apparatus 100 may perform display of a message notifying that there is the message on the display 110, light emission of the indicator 111, swing of the torso unit 104, and the like, in order to show that there is the message to the user Y. FIG. 5 is an explanatory view illustrating an operation example of the agent apparatus 100 according to the embodiment of the present disclosure, and illustrates a state in which the agent apparatus 100 is performing light emission of the indicator 111, swing of the torso unit 104, and the like. Note that, when a human sensor detects that a person is present nearby even if the face recognition processing and the voice print recognition processing are not performed, the agent apparatus 100 may cause the indicator 111 to emit light and the torso unit 104 to swing in order to show that there is the message. Furthermore, the control unit 114 may perform the light emission of the indicator 111 and the swing of the torso unit 104 in a case where the user hasn't uttered anything although the face recognition using the captured data by the camera 124 or the detection by the human sensor included in the sensor 112 has been able to be performed.

By the way, when the user X speaks to the agent apparatus 100 that "please tell a message to Y", there are cases where the agent apparatus 100 cannot recognize who the "Y" is. For example, in a case where a child wants to leave a message to his father, he will say that "please tell a message to Dad", and in a case where the father's parent wants to leave a message to the father, the parent may tell his name and speak. In this case, although a message target is the same in both cases, the agent apparatus 100 may not be able to recognize whether the pronoun "Dad" and the proper noun "name" are the same. Therefore, in a case where the agent apparatus 100 cannot uniquely determine the target of the message, the agent apparatus 100 may output information for explicitly setting the target of the message.

Figure 6:
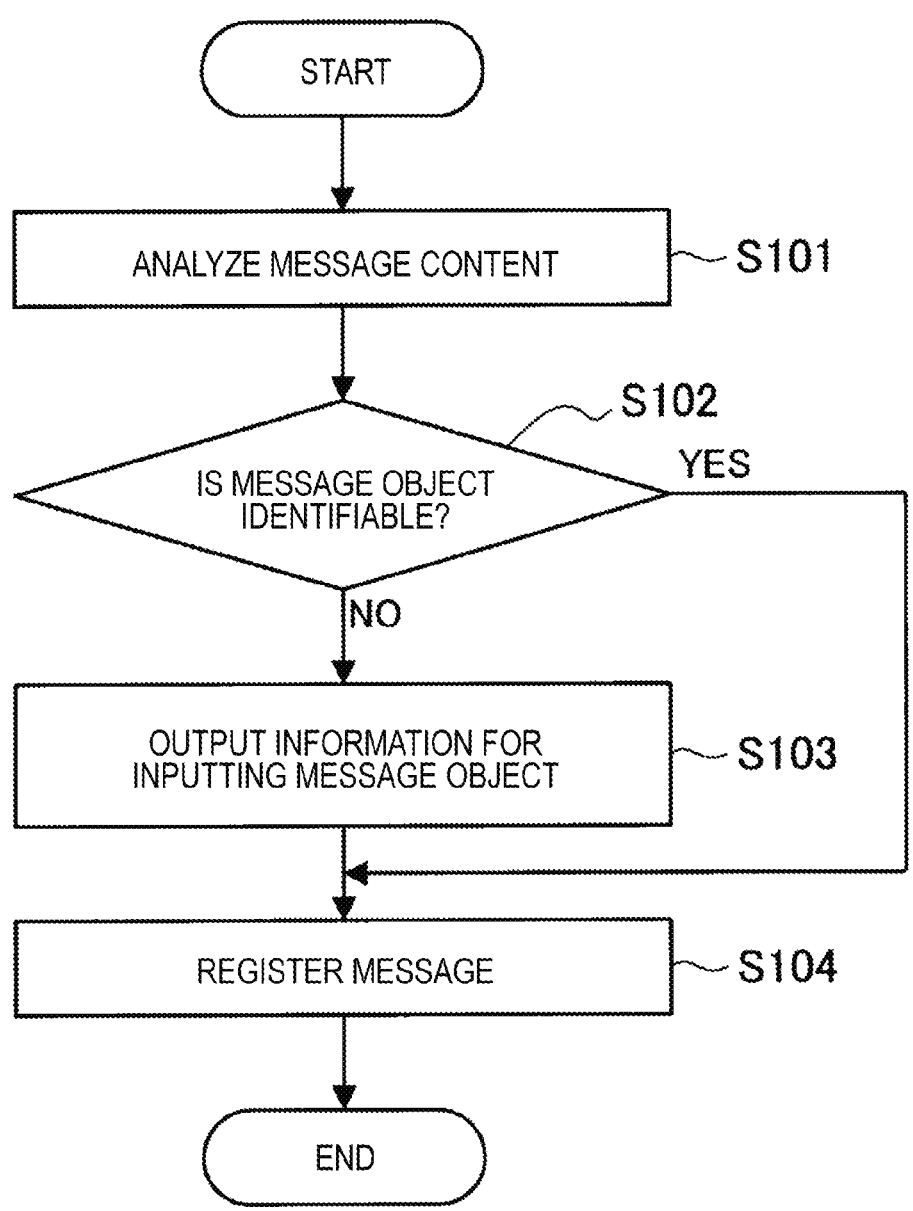
FIG. 6 is a flowchart illustrating an operation example of the agent apparatus 100 according to the embodiment.

FIG. 6 is a flowchart illustrating an operation example of the agent apparatus 100 according to the embodiment of the present disclosure. Hereinafter, an operation example of the agent apparatus 100 according to the embodiment of the present disclosure will be described with reference to FIG. 6.

When a certain user utters a message to the agent apparatus 100, the agent apparatus 100 analyzes the message content by the control unit 114 (step S101). The agent apparatus 100 determines whether the target of the message is specifiable by the control unit 114 as a result of the analysis of the message content in the control unit 114 (step S102).

As a result of the determination in step S102, in a case where the target of the message cannot be specified (No in step S102), the agent apparatus 100 outputs the information for prompting the user to input the message target by the operation of the control unit 114 (step S103). The information for prompting the user to input the message target may be displayed on the display 110 or may be output as a sound from the speaker 118.

Figure 7:
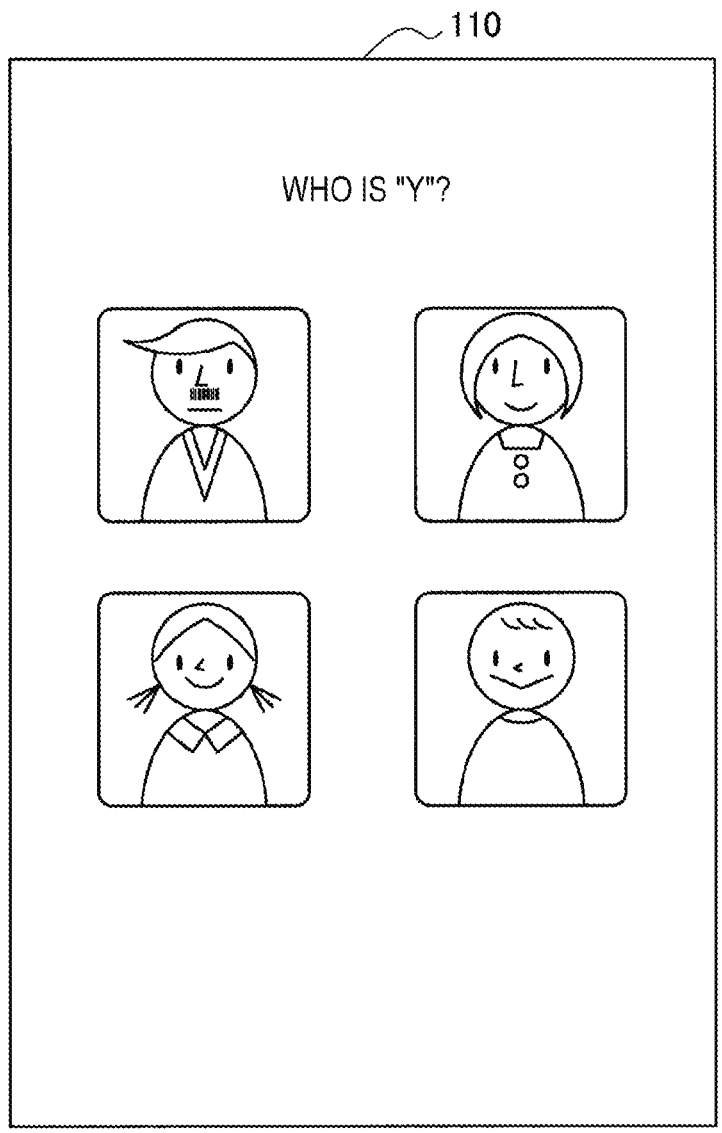
FIG. 7 is an explanatory view illustrating an example of a user interface displayed on a display 110 by the agent apparatus 100.

An example of displaying the information for prompting the user to input the message target on the display 110 is illustrated. FIG. 7 is an explanatory view illustrating an example of a user interface displayed on the display 110 by the agent apparatus 100. When the agent apparatus 100 cannot uniquely specify who "Y" is in a case where the user X utters that "please tell a message to Y", a user interface for prompting the user X to input who the "Y" is displayed on the display 110, as illustrated in FIG. 7. What is displayed here is, for example, information of the user who is a candidate of the destination of the message, such as a face picture, a name, and the like of the user registered in the agent apparatus 100 in advance. At that time, it is desirable that the user who has uttered the message (here, the user X) is excluded from the display target of the face picture and the name. The user who has uttered the message can instruct the agent apparatus 100 who is "Y" by operating the user interface displayed on the display 110.

When prompting the user to input the message target in step S103 above, or in a case where the target of the message can be specified as a result of the determination in step S102 (step S102, Yes), the agent apparatus 100 executes message registration process ng by the control unit 114 (step S104).

The agent apparatus 100 according to the embodiment of the present disclosure executes such a series of operations to output the information for explicitly setting the target of the message and prompt the user to input the target of the message in a case where the target of the message cannot be uniquely determined.

The agent apparatus 100 can receive a message even in a state where the user is not directly speaking to the apparatus. For example, the user may output a message to the agent apparatus 100 using a device such as a mobile phone, a video phone, or a game machine connected via a network. The agent apparatus 100 that has received the message from the above device by the communication unit 126 may analyze the content of the message by the control unit 114 and specify a source and a notification destination of the message.

Furthermore, in a case where the user who is the target of the message has listened to or viewed the message, the agent apparatus 100 may notify the device of the user at the source of the message that the user at the destination of the message has listened to or viewed the message. Therefore, the agent apparatus 100 may store information of the device of each user in addition to information of the user who uses the agent apparatus 100. For example, in a case where the content of the message is displayed on the display 110, if it is clear that the user has viewed the message by gaze detection processing or face direction detection processing, the agent apparatus 100 may notify the device of the user at the source of the message that the user at the destination of the message has listened to or viewed the message. Furthermore, in a case where the user of the target of the message has listened to or viewed (has read) the message, the agent apparatus 100 may store the fact that the user has listened to or viewed the message in the storage unit 116, and may notify that the user of the target of the message has read the message using the display 110 or the speaker 118 when recognizing that the user at the source of the message is present in front of the apparatus afterward.

When receiving the speech of the user, the agent apparatus 100 causes the user to speak a predetermined trigger word. By detecting the trigger word, the agent apparatus 100 starts sound collection processing of the speech content of the user by the microphone 120. Note that while the agent apparatus 100 continues to determine that the user is facing the agent apparatus 100 by the gaze detection processing or the face direction detection processing using the image data captured by the camera 124, the agent apparatus 100 may execute the sound collection processing of the speech content of the user by the microphone 120 even if the predetermined trigger word is not uttered. Then, the agent apparatus 100 may stop the sound collection processing of the speech content of the user by the microphone 120 when the user stops facing the agent apparatus 100. By operating in this manner, the agent apparatus 100 can receive a message from the user, for example, a message for another user, even if the user does not utter the trigger word.

Figure 8:
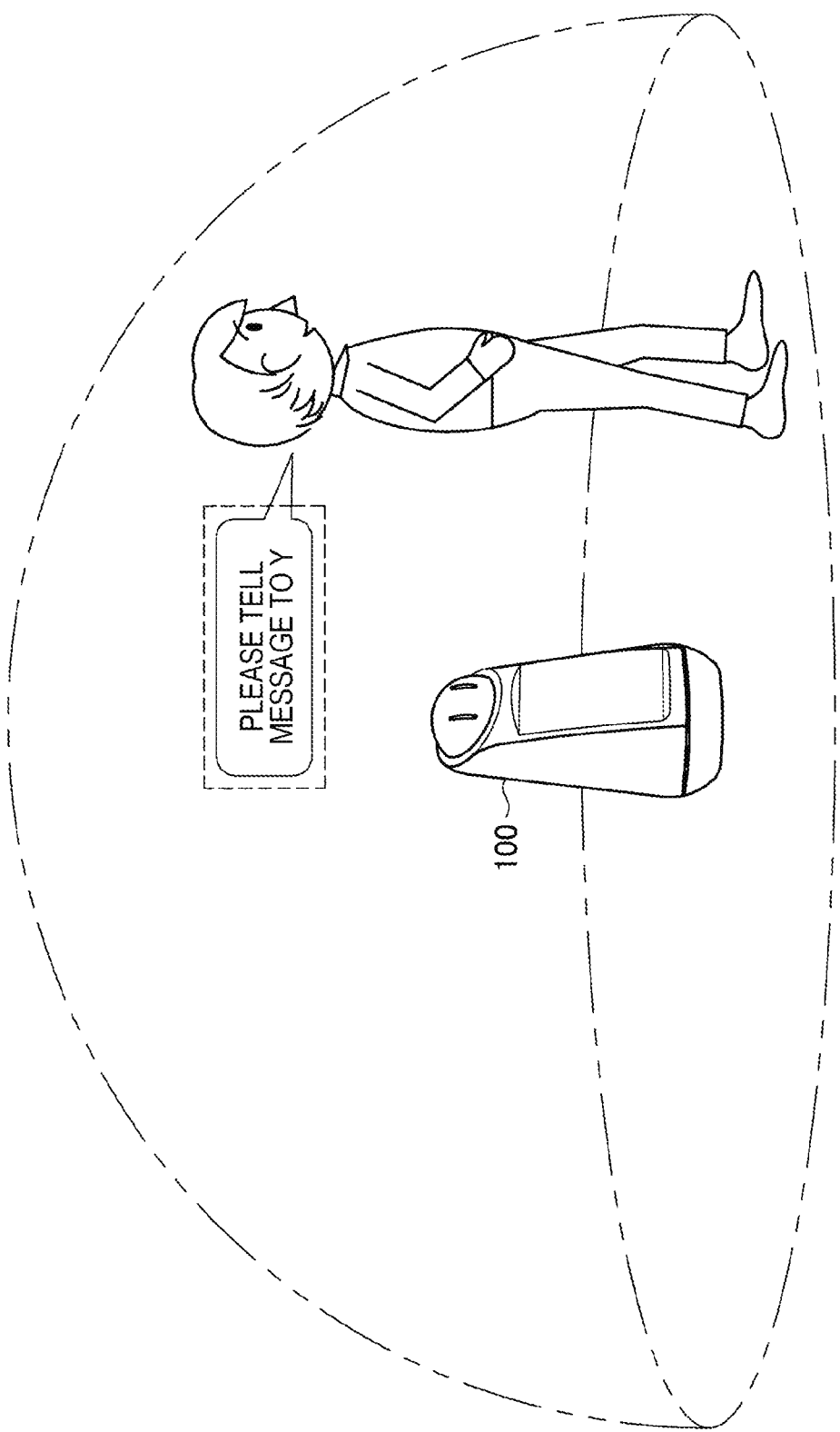
FIG. 8 is an explanatory view illustrating an example of a case where there is only one user speaking around the agent apparatus 100.

Furthermore, when the agent apparatus 100 detects the presence of the user who is speaking something, operates the torso unit 104 and the head unit 106 and captures the surroundings by the camera 124, and finds that there are no other people than the user, the agent apparatus 100 may determine that the user is speaking to the agent apparatus 100. FIG. 8 is an explanatory view illustrating an example of a case where there is only one user speaking around the agent apparatus 100. The agent apparatus 100 may execute the sound collection processing of the speech content of the user by the microphone 120 even if the user does not utter the trigger word.

In a case where the user is speaking something, the agent apparatus 100 needs to determine whether the user is speaking to the agent apparatus 100 or the user is talking to himself/herself. The agent apparatus 100 may determine whether the user is speaking to the agent apparatus 100 or the user is talking to himself/herself according to a distance to the user detected by a human sensor or the like or a sound level collected by the microphone 120. For example, in a case where the agent apparatus 100 determines that the distance to the user is smaller than a predetermined distance or the collected sound level is larger than a predetermined level, the agent apparatus 100 may determine that the user is speaking to the agent apparatus 100. Furthermore, the agent apparatus 100 may perform determination processing of the sound level collected by the microphone 120 only in a case where a human or the like is present nearby by the human sensor.

The agent apparatus 100 may change the operation depending on a case where the user who is speaking is facing the agent apparatus 100 and a case where the user who is speaking is not facing the agent apparatus 100. FIG. 9 is an explanatory view illustrating an example in which the agent apparatus 100 changes an operation depending on a case where the user who is speaking is facing the agent apparatus 100 and a case where the user who is speaking is not facing the agent apparatus 100. For example, in the case where the user who is speaking is facing the agent apparatus 100, the agent apparatus 100 performs display on the display 110 in addition to an output of a sound from the speaker 118. In the case where the user who is speaking is not facing the agent apparatus 100, the agent apparatus 100 only outputs a sound from the speaker 118. In the case where the user who is speaking is not facing the agent apparatus 100, the agent apparatus 100 may increase an amount of information to be output as a sound. Note that the agent apparatus 100 only outputting a sound from the speaker 118 may be limited to a state where the agent apparatus 100 is driven by a battery.

By causing the agent apparatus 100 to capture an inside of a room and recognize a home appliance in the room, the agent apparatus 100 can perform a remote control for the home appliance. FIG. 10 is an explanatory view illustrating a state of causing the agent apparatus 100 to recognize an air conditioner and causing the agent apparatus 100 to remotely operate the air conditioner. If the image data captured by the camera 124 includes the home appliance and a code of the home appliance, the agent apparatus 100 can download a remote control code corresponding to the code from the Internet. Then, the agent apparatus 100 can remotely operate the home appliance using the downloaded remote control code.

When the user presents the IC card capable of non-contact communication to the agent apparatus 100, the agent apparatus 100 may rotate the torso unit 104 to direct the reader/writer 128 toward the user. FIG. 11 is an explanatory view illustrating a state in which the agent apparatus 100 directs the reader/writer 128 toward the user when an IC card 200 is presented to the agent apparatus 100. When causing the agent apparatus 100 to perform this operation, whether the entire IC card 200 is included in the image data may be recognized by the control unit 114 using the image data captured by the camera 124, and whether a predetermined mark indicating a card having a proximity non-contact communication function is included in the image data may be recognized by the control unit 114. Furthermore, when causing the agent apparatus 100 to perform this operation, information regarding which card is the card having a proximity non-contact communication function or which card with a mark is the card having a proximity non-contact communication function is registered in the agent apparatus 100 in advance.

The agent apparatus 100 may add age restriction to the information output. For example, the presence of a primary school user is registered in the agent apparatus 100 in advance and when the presence of the primary school user around the agent apparatus 100 is recognized by the face recognition processing, the voice print recognition processing, or the like, the agent apparatus 100 restricts output of information if there is information that the primary school children should not know.

The agent apparatus 100 recognizes a face from the image captured by the camera 124, and outputs information corresponding to the face according to the user. For example, since train lines usually used by a father and a mother are different, the agent apparatus 100 may acquire information of the train line used by the father in a case of recognizing the father and information of the train line used by the mother in a case of recognizing the mother from the internet and provides the information as a sound or the like.

In a case where a plurality of agent apparatuses 100 faces one another, one agent apparatus 100 may move following movement of the agent apparatus 100 in front of the apparatus. At this time, the agent apparatus 100 may capture the movement of the agent apparatus 100 in front of the apparatus by the camera 124 and move following the movement of the agent apparatus 100 in front of the apparatus by analyzing the image data. Furthermore, the agent apparatus 100 captures a code such as a two-dimensional bar code displayed on the display 110 of the agent apparatus 100 in front of the apparatus by the camera 124, and acquires motion data corresponding to the code from the Internet or from the storage unit 116, thereby pretending as if the agent apparatus 100 moves following the movement of the agent apparatus 100 in front of the apparatus.

In the case where the agent apparatus 100 moves following the movement of the agent apparatus 100 in front of the apparatus, and in a case where the agent apparatus 100 performs first-time movement, the agent apparatus 100 may awkwardly perform the movement. Then, the agent apparatus 100 may gradually and smoothly move as the agent apparatus 100 performs the movement several times. The agent apparatus 100 can make itself appear as if the agent apparatus 100 is learning the movement as the movement is gradually smoothed.

The agent apparatus 100 may cause the camera 124 to capture a video of a television or the microphone 120 to collect a sound of the television, and may learn the content of the displayed video or the output sound. Then, when the user comes home at night, the agent apparatus 100 may output the learned content as a sound, an image, or the like. For example, the agent apparatus 100 measures the number of appearances of a proper noun from the content of the video and the sound, and determines that the proper noun with the large number of appearances was a popular topic on television on that day. Then, the agent apparatus 100 notifies the user who has come home that the proper noun with the large number of appearances was a popular topic. At this time, the agent apparatus 100 may notify the user who has come home which keyword was a popular topic in which program by linking the keyword with data of an electronic program guide (EPG).

Since the agent apparatus 100 includes the camera 124 and the display 110, for example, if a face is included in the image data captured by the camera 124, the agent apparatus 100 may apply a predetermined effect such as an effect of adding an animal's ear or nose to the face and display an image on the display 110. When recognizing the face from the image data captured by the camera 124, the agent apparatus 100 may output a sound such as "I'll transform you into an animal" and give the effect to the face and display an image. At this time, when the user utters a name of an animal, such as "I want to be transformed into a rabbit," the agent apparatus 100 may give the effect of adding an ear, a nose, or the like of the animal. Further, at this time, the agent apparatus 100 may preferentially give the same effect to the same user. Further, at this time, the agent apparatus 100 may change the animal of the effect depending on whether the recognized face is an adult or a child.

Figure 12:
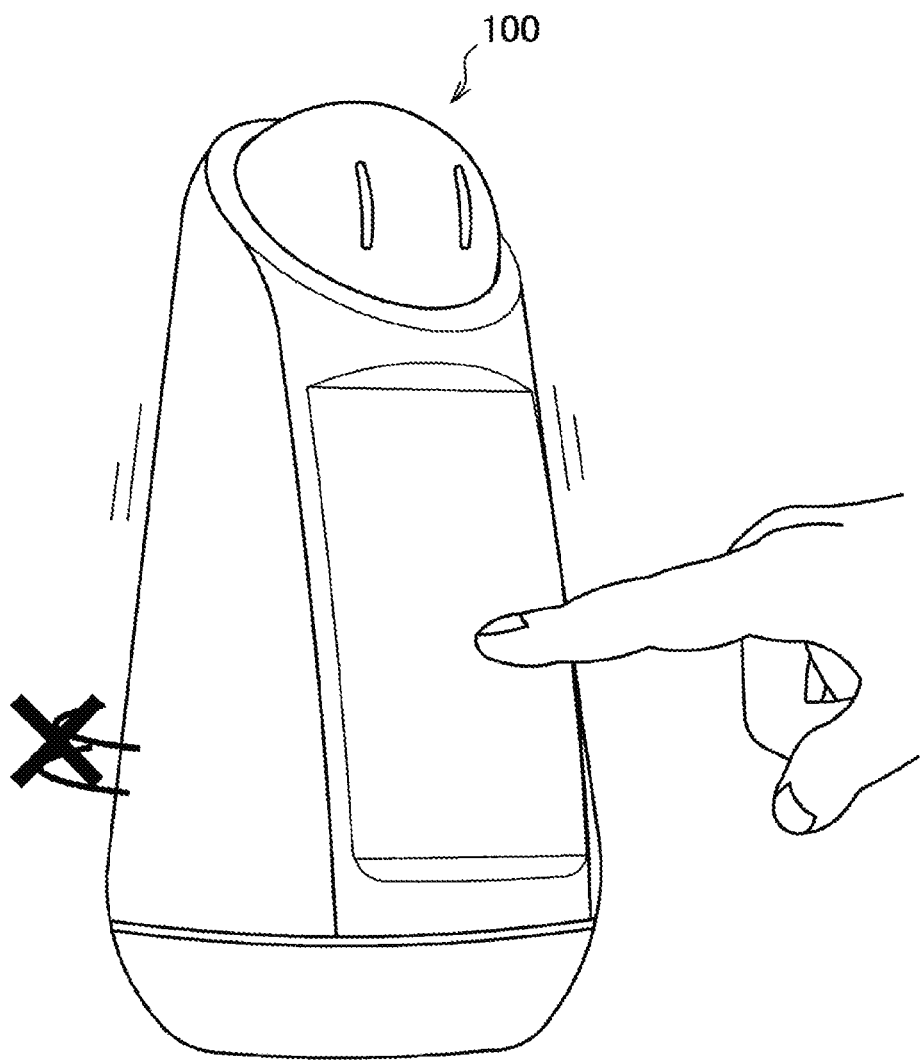
FIG. 12 is an explanatory view illustrating an example of a state in which the user is touching a display 110.

The agent apparatus 100 can rotate the torso unit 104 as described above, but if the agent apparatus 100 rotates the torso unit 104 in a state where the user is touching the display 110, the rotation interferes with the operation of the user. Therefore, the agent apparatus 100 may prevent the torso unit 104 from being rotated in the state where the user is touching the display 110. FIG. 12 is an explanatory view illustrating an example of a state in which the user is touching a display 110. In the state where the user is touching the display 110, the agent apparatus 100 may operate the head unit 106 and may stop the operation of the head unit 106.

Furthermore, when the agent apparatus 100 rotates the torso unit 104 in a state where the user is viewing the display 110, the rotation hinders confirmation of information by the user. Therefore, when the agent apparatus 100 detects that the user is gazing at the display 110 by the gaze detection processing using the image data captured by the camera 124, the agent apparatus 100 may prevent the torso unit 104 from being rotated. In the state where the user is viewing the display 110, the agent apparatus 100 may operate the head unit 106 and may stop the operation of the head unit 106.

Then, the agent apparatus 100 may release the restriction on the operation of the torso unit 104 when the operation of the display 110 and the gaze are not performed for a predetermined time.

The agent apparatus 100 may keep a log of a time to go out and a time to come home, and in a case where the user comes home later than usual on a certain day, the agent apparatus 100 may hold the head unit 106 down to express sadness. Then, when the user comes home later than usual, the agent apparatus 100 may output words of appreciation to the user from the speaker 118.

As described above, the agent apparatus 100 can include various sensors. For example, since people becomes susceptible to cold and influenza when temperature and humidity decrease in winter, the agent apparatus 100 may sense an indoor state by a temperature sensor or a humidity sensor and output, a sound such as sneezing or coughing from the speaker 118 when a predetermined condition is satisfied. Furthermore, the agent apparatus 100 may sense the indoor state by the temperature sensor or the humidity sensor and output words prompting operation of the air conditioner from the speaker 118 because the room temperature is high or remotely operate the air conditioner when a predetermined condition is satisfied.

The agent apparatus 100 can present various expressions by moving the torso unit 104 or the head unit 106 or changing the light emission regions or the light emission colors of the light emitting units 108a and 108b.

Figure 13:
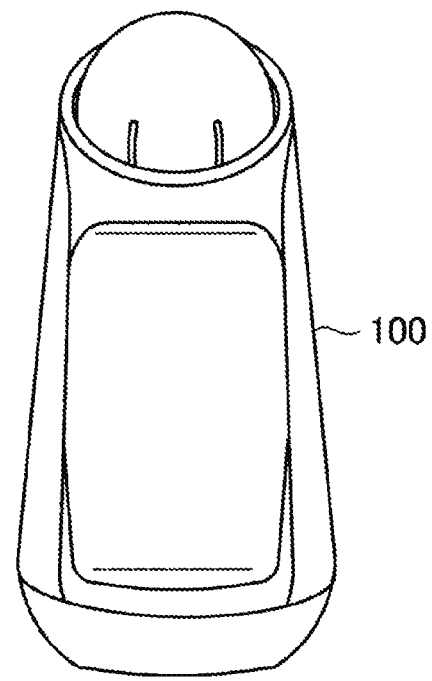
FIG. 13 is an explanatory view illustrating an example of expression presented by the agent apparatus 100.

For example, the agent apparatus 100 may have a downcast expression when the agent apparatus 100 is told disgusting words or get yelled by the user. FIG. 13 is an explanatory view illustrating an example of expression presented by the agent apparatus 100, and is an explanatory view illustrating a state in which the agent apparatus 100 holds the head unit 106 down having a downcast expression. When the agent apparatus 100 recognizes the user's face for a predetermined period (for example, 24 hours) after the agent apparatus 100 is told disgusting words or get yelled by the user, the agent apparatus 100 may increase the frequency of executing the downcast expression holding the head unit 106 down. Then, when the user utters an apology, the agent apparatus 100 may stop such a downcast expression.

Figure 14:
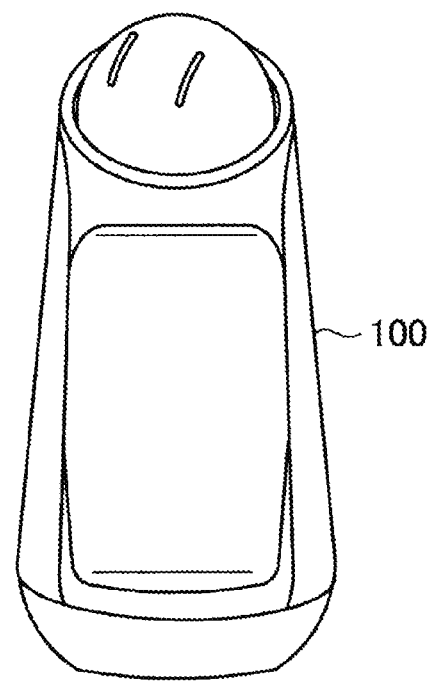
FIG. 14 is an explanatory view illustrating an example of expression presented by the agent apparatus 100.

Since the agent apparatus 100 can be connected to the Internet through the communication unit 126, the agent apparatus 100 can obtain weather forecast and rain cloud radar information from the Internet. Therefore, when detecting that the weather is likely to significantly change, the agent apparatus 100 may present an expression conveying that the weather is likely to change by looking toward the window or looking up. At that time, the agent apparatus 100 may not only look out of the window but also output that the weather is likely to change, as a sound, a text, an image, or the like. FIG. 14 is an explanatory view illustrating an example of expression presented by the agent apparatus 100, and is an explanatory view illustrating a state in which the agent apparatus 100 holds the head unit 106 up having an expression conveying that weather is likely to change.

Furthermore, the agent apparatus 100 may make an expression conveying occurrence of an astronomical event different from usual by looking toward the window or looking up, when the different astronomical event occurs, such as a full moon day, a super moon day, or a day when meteor shower can be observed. At this time, the agent apparatus 100 not only looks toward the window or looks up, but may also display a message such as "Do you want to look at the sky?" on the display 110 or output the message from the speaker 118.

The agent apparatus 100 may present an expression of being sleepy when a predetermined time comes. For example, when a time after lunch, a time for a child to go to sleep, or the like comes, the agent apparatus 100 may present the expression of being sleepy. At that time, the agent apparatus 100 may change the light emission regions of the light emitting units 108a and 108b to present an expression of sleepy eyes or may swing the head unit 106 to present an expression of being sleepy. FIG. 15 is an explanatory view illustrating an example of expression presented by the agent apparatus 100, and is an explanatory view illustrating a state in which the agent apparatus 100 expresses as it the agent apparatus 100 were to become sleepy.

In addition, when detecting a loud sound around the apparatus, the agent apparatus 100 may raise the head unit 106 to look around and present a surprising expression. Furthermore, when detecting drop of the room temperature, the agent apparatus 100 may slightly move the torso unit 104 to express shaking. Furthermore, at the season of hay fever, the agent apparatus 100 may sharply change the light emission regions of the light emitting units 108a and 108b to express blinking or cause the light emitting units 108a and 108b to emit red light to express red eyes.

Furthermore, the agent apparatus 100 may change the colors of the light emitting units 108a and 108b according to an uttered language. For example, in a case where the agent apparatus 100 utters Japanese, the colors of the light emitting units 108a and 108b may be changed to white, and in a case where the agent apparatus 100 utters English, the colors of the light emitting units 108a and 108b may be changed to bluish color.

Furthermore, the agent apparatus 100 may change the light emission colors and the light emission patterns of the light emitting units 108a and 108b and the indicator 111 depending on a case where the power is supplied from a wall outlet and a case where the agent apparatus 100 is driven by a battery. Furthermore, the agent apparatus 100 may stop the operation of the sensor 112 in the case where the agent apparatus 100 is driven by a battery.

2. Conclusion

As described above, according to the embodiment of the present disclosure, the agent apparatus 100 capable of reliably delivering a message to a party to which the user wants to give a message is provided.

The steps in the processing performed by each device in the present specification do not necessarily need be processed chronologically in the order described as the sequence diagram or the flowchart. For example, the steps in the processing executed by each device may be processed in an order different from the order described as the flowchart or may be processed in parallel.

Furthermore, a computer program for causing the hardware such as the CPU, the ROM, and the RAM built in each device to exhibit a function at a similar level to the above-described configuration of each device. Furthermore, a storage medium that has stored the computer program can be provided. Furthermore, by configuring each functional block illustrated in the functional block diagram by hardware, a series of processing can be realized by hardware.

Although the favorable embodiments of the present disclosure have been described in detail with reference to the accompanying drawings, the technical scope of the present disclosure is not limited to such examples. It is obvious that persons having ordinary knowledge in the technical field of the present disclosure can conceive various modifications or alterations within the scope of the technical idea described in the claims, and it is naturally understood that these modifications and alterations belong to the technical scope of the present disclosure.

Furthermore, the effects described in the present specification are merely illustrative or exemplary and are not restrictive. That is, the technology according to the present disclosure can exert other effects obvious to those skilled in the art from the description of the present specification in addition to or in place of the above-described effects.

Note that following configuration also belong to the technical scope of the present disclosure.

(1)

An information processing apparatus including:

an acquisition unit configured to acquire information including a sound message; and a control unit configured to recognize a sender of the sound message, a destination of a message included in the sound message, and content of the message from the information acquired by the acquisition unit, in which the control unit generates information for inputting the destination of the message in a case where the control unit is not able to uniquely specify the destination.

(2)

The information processing apparatus according to (1), in which the control unit includes an image for selecting the destination of the message from candidates of the destination of the message, as the information for inputting the destination of the message.

(3)

The information processing apparatus according to (1), in which the control unit outputs information for selecting, by a sound, the destination of the message from candidates of the destination of the message, as the information for inputting the destination of the message.

(4)

The information processing apparatus according to any one of (1) to (3), in which the control unit outputs the message for the destination when recognizing a person which is the destination of the message.

(5)

The information processing apparatus according to any one of (1) to (4), further including:

a torso unit provided with a display unit that displays information, in which
the control unit controls the torso unit to swing when detecting approach of a human in a state where the message is registered.

(6)
The information processing apparatus according to any one of (1) to (5), further including:
a torso unit provided with a display unit that displays information, in which
the control unit controls an operation of the torso unit to stop when detecting that an operation to the display unit is being performed.

(7)
The information processing apparatus according to any one of (1) to (6), in which the control unit performs control for notifying a device of the sender that the person which is the destination of the message has received the message.

(8)
The information processing apparatus according to (7), further including:
a torso unit provided with a display unit that displays information, in which
the control unit performs control for notifying the device of the sender that the person which is the destination of the message has received the message in a case where the person which is the destination of the message has viewed the message displayed on the display unit.

(9)
The information processing apparatus according to any one of (1) to (8), further including:
an imaging unit configured to capture an image, in which
the control unit starts acquisition of the information when a face is included in the image captured by the imaging unit.

(10)
An information processing method for causing a processor to execute:
acquiring information including a sound message;
recognizing a sender of the sound message, a destination of a message included in the sound message, and content of the message from the acquired information; and
generating information for inputting the destination of the message in a case where the destination is not able to be uniquely specified.

(11)
A computer program for causing a computer to execute:
acquiring information including a sound message;
recognizing a sender of the sound message, a destination of a message included in the sound message, and content of the message from the acquired information; and
generating information for inputting the destination of the message in a case where the destination is not able to be uniquely specified.

REFERENCE SIGNS LIST

100 Agent apparatus
102 Base unit
104 Torso unit
106 Head unit
108a, 108b Light emitting unit
110 Display

The invention claimed is:
1. An information processing apparatus comprising:
a torso provided with a display that displays information;
circuitry configured to:
acquire information including a sound message;
recognize a sender of the sound message, a destination of a message included in the sound message, and content of the message from the acquired information,
wherein the sender is recognized by performing voice print recognition;
generate and display information for inputting the destination of the message in a case where the circuitry is not able to uniquely specify the destination; and
swing the torso when detecting approach of a human in a state where the message is registered.

2. The information processing apparatus according to claim 1, wherein the information for inputting the destination of the message comprises an image for selecting the destination of the message from candidates of the destination of the message.

3. The information processing apparatus according to claim 1, wherein the circuitry outputs information for selecting, by a sound, the destination of the message from candidates of the destination of the message, as the information for inputting the destination of the message.

4. The information processing apparatus according to claim 1, wherein the circuitry outputs the message for the destination when recognizing a person which is the destination of the message.

5. The information processing apparatus according to claim 1, wherein the circuitry is further configured to:
controls an operation of the torso to stop when detecting that an operation to the display is being performed.

6. The information processing apparatus according to claim 1, wherein the circuitry performs control for notifying a device of the sender that the person which is the destination of the message has received the message.

7. The information processing apparatus according to claim 6, wherein the circuitry is further configured to:
perform control for notifying the device of the sender that the person which is the destination of the message has received the message in a case where the person which is the destination of the message has viewed the message displayed on the display.

8. The information processing apparatus according to claim 1, further comprising:
an imaging unit configured to capture an image, wherein
the circuitry starts acquisition of the information when a face is included in the image captured by the imaging unit.

9. An information processing method for causing a processor to execute:
acquiring information including a sound message;
recognizing a sender of the sound message, a destination of a message included in the sound message, and content of the message from the acquired information,
wherein the sender is recognized by performing voice print recognition;
generating and displaying information for inputting the destination of the message in a case where the destination is not able to be uniquely specified; and
swing a torso provided with a display when detecting approach of a human in a state where the message is registered.

10. A non-transitory computer readable medium comprising a computer program for causing a computer to execute:
acquiring information including a sound message;
recognizing a sender of the sound message, a destination of a message included in the sound message, and content of the message from the acquired information, wherein the sender is recognized by performing voice print recognition;

generating information for inputting the destination of the message in a case where the destination is not able to be uniquely specified; and swinging a torso provided with a display when detecting approach of a human in a state where the message is registered.

* * * * *